(12) United States Patent
DeCruz et al.

(10) Patent No.: US 11,383,196 B2
(45) Date of Patent: Jul. 12, 2022

(54) METHOD AND APPARATUS FOR DECOMPOSING CARBON DIOXIDE GAS

(71) Applicants: Adele G DeCruz, Brooklyn, NY (US); Mara Camaiti, Florence (IT)

(72) Inventors: Adele G DeCruz, Brooklyn, NY (US); Mara Camaiti, Florence (IT)

(73) Assignee: MONALASER, LLC, Chapel Hill, NC (US)

( * ) Notice: Subject to any disclaimer, the term of this patent is extended or adjusted under 35 U.S.C. 154(b) by 403 days.

(21) Appl. No.: 15/890,708

(22) Filed: Feb. 7, 2018

(65) Prior Publication Data

US 2018/0345203 A1     Dec. 6, 2018

Related U.S. Application Data

(60) Provisional application No. 62/514,284, filed on Jun. 2, 2017.

(51) Int. Cl.
| | |
|---|---|
| *B01J 19/12* | (2006.01) |
| *B01D 53/00* | (2006.01) |
| *C01B 32/05* | (2017.01) |
| *C01B 13/02* | (2006.01) |

(52) U.S. Cl.
CPC .......... *B01D 53/007* (2013.01); *B01J 19/121* (2013.01); *C01B 13/0203* (2013.01); *C01B 32/05* (2017.08); *B01D 2257/504* (2013.01); *B01D 2258/0283* (2013.01); *B01D 2259/808* (2013.01); *B01J 2219/0869* (2013.01); *B01J 2219/0875* (2013.01); *B01J 2219/12* (2013.01)

(58) Field of Classification Search
CPC ............ B01D 53/007; B01D 2257/504; B01D 2258/0283; B01D 2259/808; B01J 19/121; B01J 2219/0869; B01J 2219/12; B01J 2219/0875; C01B 32/05; C01B 13/0203; Y02P 20/151
USPC .............................. 204/157.41, 157.61, 157.5
See application file for complete search history.

(56) References Cited

U.S. PATENT DOCUMENTS

| | | | | |
|---|---|---|---|---|
| 5,323,413 | A | * | 6/1994 | Gergely ................. B01J 19/121 204/157.4 |
| 5,770,785 | A | * | 6/1998 | Tamura ................ B01D 53/007 204/157.3 |
| 5,976,325 | A | * | 11/1999 | Blanks .................... C01F 7/144 204/157.41 |
| 7,807,025 | B2 | | 10/2010 | Maekawa et al. |
| 8,038,849 | B2 | | 10/2011 | Maekawa et al. |
| 8,992,738 | B2 | * | 3/2015 | Gafney ..................... C07C 1/12 204/157.15 |
| 2008/0210542 | A1 | * | 9/2008 | Maekawa .............. B01J 19/121 204/157.41 |
| 2009/0194408 | A1 | * | 8/2009 | Yang ...................... B01D 53/32 204/165 |

(Continued)

FOREIGN PATENT DOCUMENTS

JP             56063812 A    *    5/1981

*Primary Examiner* — Nicholas A Smith
*Assistant Examiner* — Colleen M Raphael
(74) *Attorney, Agent, or Firm* — Terry M. Sanks, Esq.; Beusse Sanks, PLLC

(57) ABSTRACT

A method of producing carbon-oxygen structures by the Decomposition of Carbon Dioxide Gas at low pressure, from 14.7 to 100 psi, using laser irradiation in the mid-infrared spectrum, from 2.3 to 3.3 microns.

11 Claims, 3 Drawing Sheets

(56) References Cited

U.S. PATENT DOCUMENTS

| | | | |
|---|---|---|---|
| 2012/0034150 A1* | 2/2012 | Noyes | B82Y 40/00 977/742 |
| 2014/0179810 A1* | 6/2014 | Yoon | B01J 23/44 518/711 |
| 2015/0086468 A1* | 3/2015 | Noyes | B82Y 40/00 423/445 R |

* cited by examiner

METHOD AND APPARATUS FOR DECOMPOSING CARBON DIOXIDE GAS

This application claims the benefit of U.S. Provisional Application No. 62/514,284, filed Jun. 2, 2017.

FIELD OF THE INVENTION

This invention relates to a method for producing carbon-oxygen structures by the Decomposition of Carbon Dioxide Gas using laser irradiation in the mid-infrared from 2.3 to 3.3 microns.

BACKGROUND OF THE INVENTION

The green-house effect caused by an increase of $CO_2$ in the atmosphere is considered the major contributor to climatic changes. This effect causes the disturbance of the thermal balance and exchange in the atmosphere. The increase of $CO_2$ concentration is mainly due to emissions of exhausts from the combustion of petroleum and coal based products. The challenge is to reduce these emissions by the use of energy produced by alternative sources or to decompose the $CO_2$ gas before it enters in the atmosphere.

The level of $CO_2$ in an unpolluted atmosphere is about 260 ppm. The present atmospheric content of $CO_2$, measured in 2016, passes the threshold of 400 ppm and this has been predicted to be a permanent condition. Some attempts to alleviate this condition have been proposed by different methods of decomposition of $CO_2$; these are, for example, by plasma methods, irradiation by thermal neutrons, by UV photo-decomposition, by Pd-mixed-conducting oxide catalyst, by dc corona discharges, or by UV laser irradiation.

In many of these methods CO and oxygen/ozone were obtained, while in other methods carbon particles and oxygen were produced. In all of these methods the operative conditions were drastic or dangerous using strong methods of radiation source or $CO_2$ in supercritical conditions. Thus, a continuing need exists to find simple, low cost and effective controlled techniques to induce decomposition of $CO_2$ in non-gaseous products.

The inventors have that a laser in the mid-infrared at 2.94 μm produces carbon particles and carbon-oxygen structures due to the laser radiation interaction with the —OH groups created by the presence of water vapor and to the high temperature rise caused by the photo-excitation of —OH groups.

In the U.S. Patents to Maeckawa et al., U.S. Pat. Nos. 7,807,025 and 8,038,849, a method for carbon dioxide production includes the steps of irradiating carbon dioxide in a supercritical or subcritical state near the critical point with a UV laser beam to decompose the carbon dioxide to form a carbon particle structure.

SUMMARY OF THE INVENTION

This invention relates to a method for producing carbon-oxygen structures by the Decomposition of Carbon Dioxide Gas at low pressure, from 14.7 to 100 psi, using laser irradiation in the mid-infrared from 2.3 to 3.3 microns. Carbon particles and carbon-oxygen structures are formed by the decomposition of the carbon dioxide in presence of water vapor. The method of decomposing carbon dioxide can be used as a system to remove $CO_2$ from exhausts of combustion gases of petroleum and coal based products, contributing to solving carbon dioxide induced environmental problems. In addition, the temperature is raised during the $CO_2$ decomposition, which can be used in the production of energy.

A method is taught for decomposing carbon dioxide gas by first combining carbon dioxide gas and water vapor gas molecules in a reaction container, such as glass, and then directing an mid-infrared laser beam having a wavelength of 2.3 to 3.3 microns into the reaction container to activate the carbon dioxide-water vapor complex then photo-dissociating the carbon dioxide gas into carbon, oxygen and solid carbon-oxygen structures. The reaction container is pressured to a pressure of from 14.7 to 100 psi. The laser beam may be an Er: YAG laser beam or an HF laser beam. The process can include combining the carbon dioxide gas with water vapor gas molecules to form a weakly bonded carbon dioxide-water or carbonic acid which is assisted by the polar surface of the reaction container. Energy in the form of heat from the reaction can be captured and utilized in other processes.

BRIEF DESCRIPTION OF THE DRAWINGS

The accompanying drawings, which are included to provide further understanding of the invention, are incorporated in and constitute a part of the specification and illustrate an embodiment of the invention and together with the description serve to explain the principles of the invention.

In the drawings.

DETAILED DESCRIPTION OF AN EXEMPLARY EMBODIMENT

Figure 1:
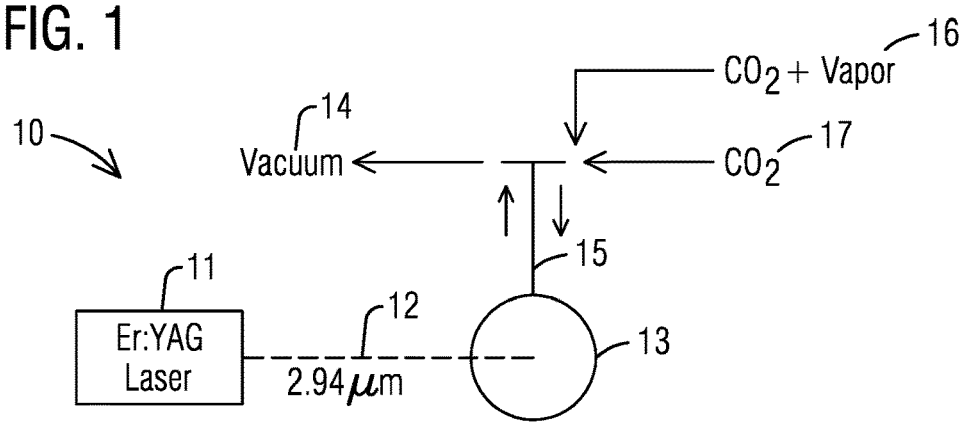
FIG. 1 is a schematic diagram of the laser controlled decomposition apparatus in accordance with the present invention.

This invention is directed to providing a method for decomposing carbon dioxide producing carbon particles and carbon-oxygen structures. The method includes flooding the carbon dioxide gas into a reaction vessel (i.e. glass vessel) and activating the gas with water vapor prior to shooting mid-infrared light through the reaction vessel. This causes a photo-excitation of the —OH activated bonds that induces the photo-decomposition or photo-dissociation of carbon dioxide gas producing carbon and carbon-oxygen species and emitting high energy. The apparatus includes a reaction vessel, a means for feeding carbon dioxide and water vapor into the reaction vessel, and an Er:YAG laser or an HF laser which irradiates mid-infrared light through the reaction vessel.

An object of the invention is to provide a practical, low risk, and environmentally safe way to remove carbon dioxide from exhausts or combustion gases of petroleum and coal based products.

Another object is to provide a method for releasing carbon dioxide using a laser and water vapor as activating specie to ensure effectiveness of the process.

Another object is to provide a method for releasing carbon dioxide in low pressure conditions, employing laser and water vapor as activating specie to ensure effectiveness of the process and reduced associated complications.

Another object is to provide a method for producing energy exploiting the photo-dissociation of carbon dioxide by a laser.

The present invention is a method of decomposing $CO_2$ gas at low pressure (from 14.7 to 100 psi). A pulsed or continues wave laser having a wavelength of 2.3 to 3.3 microns, such as an Er:YAG laser with a wavelength of 2.94 μm or HF laser at 2.7 μm is used to stimulate the —OH bonds contained in the gas system. The decomposition of $CO_2$ by laser radiation, when combined with water vapor inside a laboratory vessel, is the method used to activate the carbon-oxygen atoms. When this transformation occurs, an instantaneous flash of light, measured as black body, is observed and the temperature is increased to an estimated value of 3300K. When a glass vessel is used, contemporary to the flash of light, the silica of the glass is melted and the carbon dioxide produces both carbon particles and carbon-oxygen structures.

The present invention relates to the decomposition of carbon dioxide via mid-infrared irradiation that involves the photo-excitation of a carbon dioxide-water vapor complex with a formation of an activated species and release of energy, followed by reaction with carbon dioxide. The carbon dioxide-water vapor complex can be provided by flowing carbon dioxide gas in liquid water using conventional techniques. In certain embodiments, it is preferable for the carbon dioxide-vapor mixture to also supply only carbon dioxide gas to achieve higher concentration of carbon dioxide necessary for major amounts of carbon and carbon-oxygen product formation. Moreover, the carbon dioxide decomposition process is environmentally friendly and does not require any additional energy supply to facilitate carbon and carbon-oxygen structures formation.

In a certain embodiment, liquid water is introduced at room temperature into the reaction vessel before the introduction of carbon dioxide (molar ratio carbon dioxide/water 1:1, 2:1), but the carbon dioxide-water complex is not formed or, at least, present in a very low concentration in accordance with the following Equation: (see "On the surprising kinetic stability of carbonic acid (H2CO3)" by T. Loerting, C. Tautermann, R. T. Kroemer, I. Kohl, A. Hallbrucker, E. Mayer and K. R. Liedl in *Angew. Chem. Int. Ed.* (2000), vol. 39 (5), pp. 892-894; "Aqueous carbonic acid (H2CO3) by T. Loerting and J. Bernard in *Chem Phys Chem* (2010), vol. 11, pp. 2305-2309).

H2CO3+$n$H2O===CO2+($n$+1)H2O

Moreover, the heat gained from the released energy is dissipated from the water, producing vapor. The pressure of the reaction mixture (carbon dioxide and vapor) within the reaction vessel prior to the radiation may also vary. In certain embodiments, the pressure of carbon dioxide gas is 100 psi or less. In particular embodiments the pressure is about 15 psi, or about 100 psi.

FIG. 1 is a schematic diagram of a typical embodiment of a laser controlled decomposition apparatus for a laser controlled decomposition process. It shows a schematic of one embodiment of a laser controlled decomposition system 10 for the laser controlled decomposition process 20 illustrated in FIG. 2.

An Er:YAG laser 11 operating at 2.94 microns launches mid-infrared light 12 into the reaction chamber 13 through the glass wall of the chamber (vessel). Air inside the chamber is evacuated by a conventional vacuum pump 14 via a 3-way stopcock 15 before carbon dioxide gas and water vapor 16 are inserted into the vessel 13. Carbon dioxide 17 is inserted in the reaction chamber via the same 3-way stopcock inlet 15 using conventional techniques in order to have sufficiently high pressure to ensure efficient decomposition by mid-infrared light 12. The reaction chamber is a standard vessel designed to handle gases at relatively high pressure. Optimal photo-decomposition is obtained by utilizing a glass vessel to favor the formation of carbon dioxide-water vapor complex and to increase the efficacy of the mid-infrared light 12 within the CO2 ambient. The use of an Er:YAG laser at 2.94 microns is not a requirement to achieve photo-decomposition of the carbon dioxide gas; UV-wavelength laser beams or far UV-wavelengths are, in fact, used in the photolysis of carbon dioxide. However, the high energy obtained by photo-excitation of carbon dioxide-water complex, and the formation of activated species will increase the effectiveness of the process. Similarly, there is no restriction to mid-infrared light at 2.94 microns, but photons of sufficient energy are provided at 2.94 microns to excitate the —OH bonds. Other laser beams such as a HF laser beam with a wavelength of 2.7 microns may be appropriate for the process.

Figure 2:
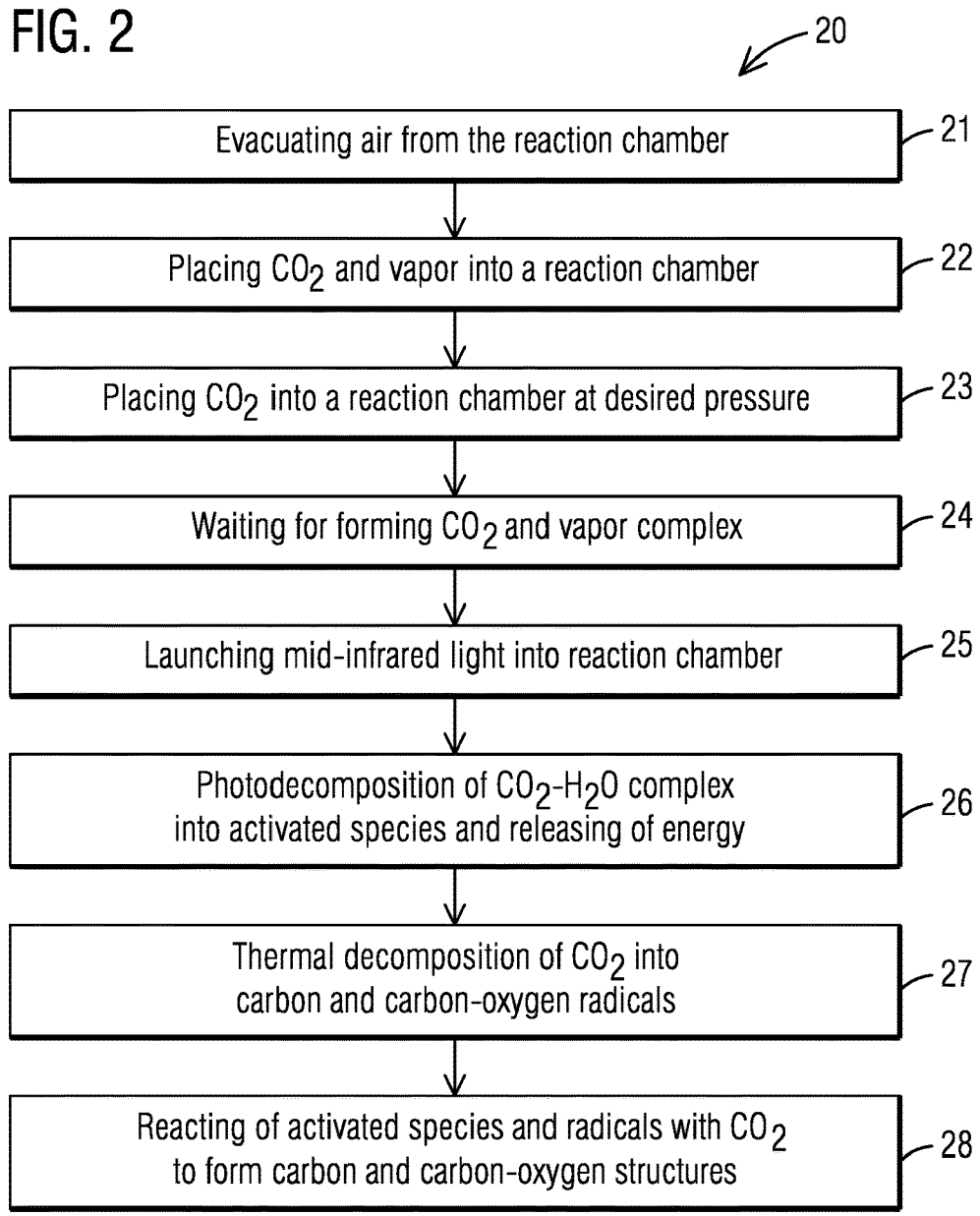
FIG. 2 is a schematic diagram of the laser controlled decomposition process in accordance with the present invention.

FIG. 2 shows a flow diagram of the process 20 of laser controlled decomposition (LCD) of carbon dioxide that requires the evacuation 21 of air from the reaction chamber 13 and the placing 22 of about 15 psi of the mixture carbon dioxide gas-water vapor within the LCD reaction chamber. The placing 23 of additional carbon dioxide gas at pressure ranging from 15 to 100 psi into the LCD reaction chamber enables the formation of important amounts of carbon and carbon-oxygen structures after the complexation 24 of carbon dioxide and vapor has occurred. Launching 25 of mid-Infrared (m-IR) photons of m-IR light 12 from Er:YAG laser 11 or another low energy photon source into LCD reaction chamber 13 in an either pulsed or continuous wave mode enables the photo-excitation 26 of the carbon dioxide-water vapor complex into activated species and releasing of energy (heat). The activated species enable a spontaneous reacting 27 with carbon dioxide to form carbon and carbon-oxygen structures. The relevant energy produced in the photo-excitation 26 can assist the reacting 27 between the activated species and CO2 favoring the thermal decomposition 28 of CO2 into carbon and oxygen. Details of this process are described below.

This process relies in the hydration of carbon dioxide gas and on the absorption properties of hydrated carbon dioxide intermediates (carbon dioxide-vapor complex and carbonic acid) in the m-IR region of the electromagnetic spectrum. Carbonic acid and its isomeric weakly bond carbon dioxide-water complex have been shown to be formed in gas phase, see "Carbonic acid in the gas phase and its astrophysical relevance", by W. Hage, K. R. Liedl, A. Hallbrucker, in *Science* (1998), vol 279, pp. 1332-1335; "Structure and internal rotation of H2O—CO2, HDO—CO2, and D2O—CO2 van der Waals complexes", by K. I. Peterson and W. Klemperer, in *J. Chem. Phys.* (1984), vol. 80, pp. 2439-2445.

Figure 3:
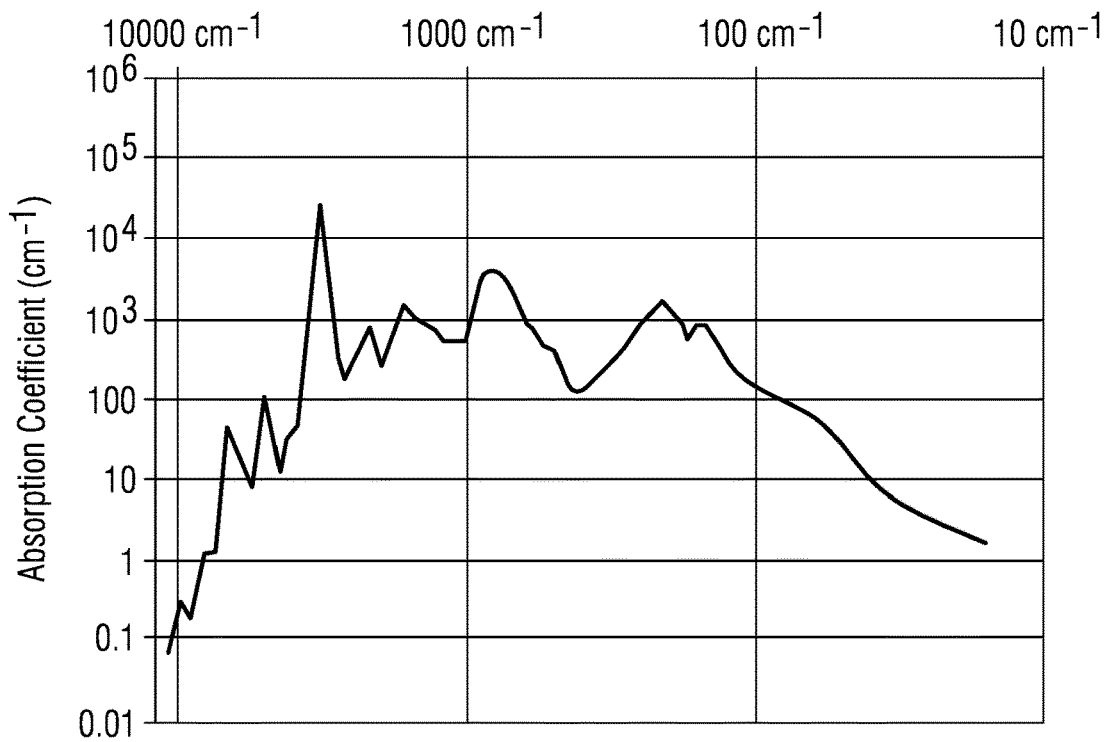
FIG. 3 shows the absorption spectrum of water in the region from 0.1 to 600 um.

FIG. 3 shows the absorption spectrum of water in the region from 0.1 to 600 μm, "Potential applications of Erbium:YAG laser in periodontics" by I. Ishikawa, A. Aoki and A. A. Takasaki in *J. Periodont. Res.* (2004), vol. 39, pp. 275-285. The strongest absorption is observed at about 3.00 μm where the —OH bonds are easily excited by the m-IR photons of an Er:YAG laser operating at 2.94 μm with releasing of energy. The great amount of heat produced (estimated temperature around 3300° K) enables the thermal dissociation of $CO_2$ into carbon and oxygen. Thermal dissociation of $CO_2$ has shown that, for each total pressure, exists a critical temperature (typically below 700° C.) above which the decomposition products of carbon and oxygen, see "The thermal decomposition of carbon dioxide" by M. H. Lietzke and C. Mullins in *J. inorg. nucl. Chem.* (1981), vol. 43, pp. 1769-1771.

An example of LCD process used to induce decomposition of $CO_2$ gas is given by:

(I) Interaction of Water Vapor with $CO_2$ Produces $$CO_{2g} + H_2O_g \rightarrow CO_2\text{—}H_2O \text{ complex,} \tag{2}$$

(II) Photo-Activation of the $CO_2$—$H_2O$ Complex According to the Reaction $$CO_2\text{—}H_2O + h\nu \rightarrow CO_2\text{—}H_2O + \text{energy} \tag{3}$$

(III) Activated Complex Reactions with $CO_2$ and Thermal Decomposition of $CO_2$ Produce

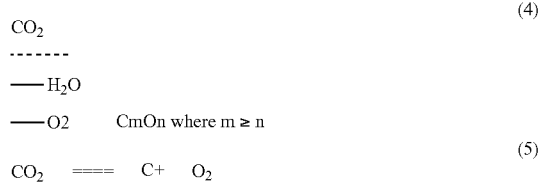

(4)

$$CO_2 \ \text{====} \ C + O_2 \tag{5}$$

The resulting product $C_mO_n$ is mixed with ablated glass and form a white deposit like cotton candy. The mixture is slightly soluble in water.

The following examples depict the various methods of the invention. These examples are intended to illustrate, not limit, the present invention.

EXAMPLE 1

The apparatus used in this example is schematically described in FIG. 1. It is constructed in glass so that the laser beam is applied through the apparatus. Carbon dioxide at 14 psi was firstly flowed in liquid water and then the mixture carbon dioxide-water vapor was introduced into the evacuated apparatus, and waited for 15-30 minutes before the irradiation with a 2.94 microns Er:YAG laser beam at 100 mJ. As a result, bright flashes of light with local and confined melting of the glass apparatus were observed as well as the production of very small amounts of carbon and carbon-oxygen particles. The melting of glass was due to the release of energy during the decomposition of the carbon dioxide-water vapor complex. SEM images taken of the confined melted glass indicated an increase of temperature during the irradiation of the carbon dioxide-water vapor complex. An EDS spectrum of the glass reactor wall after laser irradiation indicated the production of carbon and carbon-oxygen structures. For comparison, carbon dioxide at pressure of 14 psi without water vapor was irradiated with the same above laser beam (at 100 mJ and 135 mJ). As a result, no flashes of light were observed as well as the local melting of glass.

EXAMPLE 2

The procedure of Example 1 was repeated, except that an irradiation beam at 80 mJ, 135 mJ and 200 mJ were used instead of 100 mJ. As a result, it was confirmed that for all the irradiation conditions carbon and carbon-oxygen structures were produced, as well as the local melting of the glass wall of the vessel.

EXAMPLE 3

The procedure of Example 2 was repeated, except that the apparatus was first washed with a mixture sulfuric acid (99%)/hydrogen peroxide (30%) 3:1, rinsed 4 times with Milli Q water and dried in an oven at 80° C. Also in this case, it was confirmed that the decomposition of carbon dioxide occurred with release of energy and formation of carbon and carbon-oxygen structures.

Figure 4:
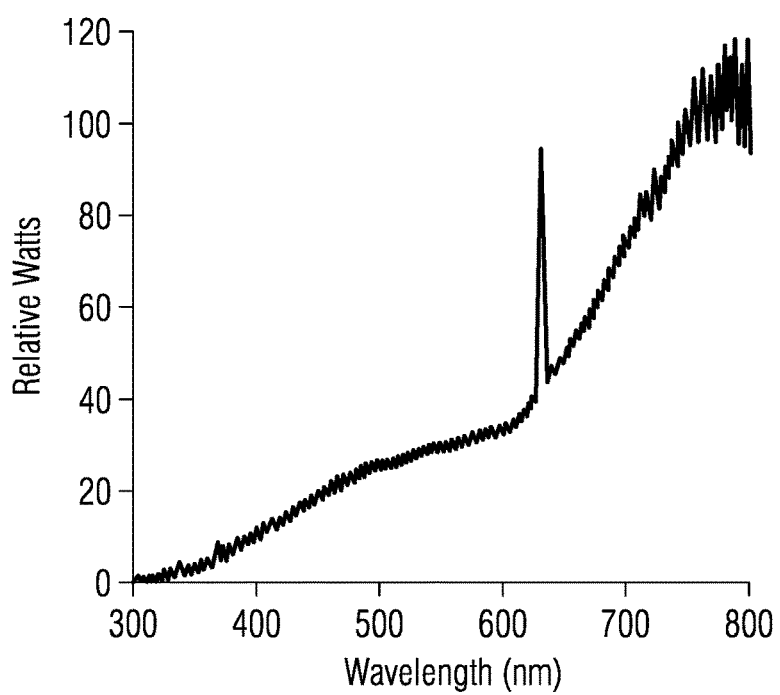
FIG. 4 shows the emission spectra of "flash light" during irradiation.
Figure 5:
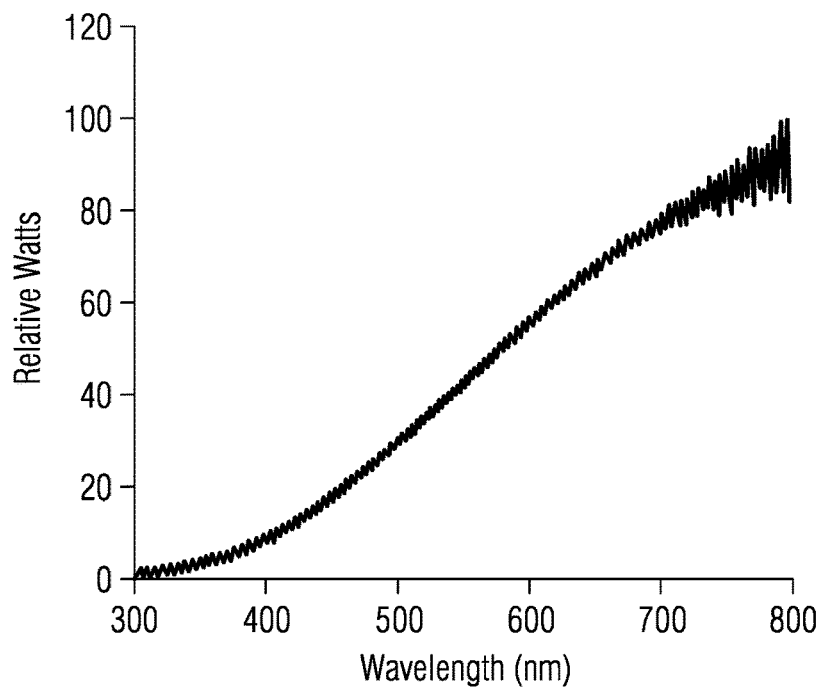
FIG. 5 shows the emission spectra of black-body light at 3300K.
Figure 6:
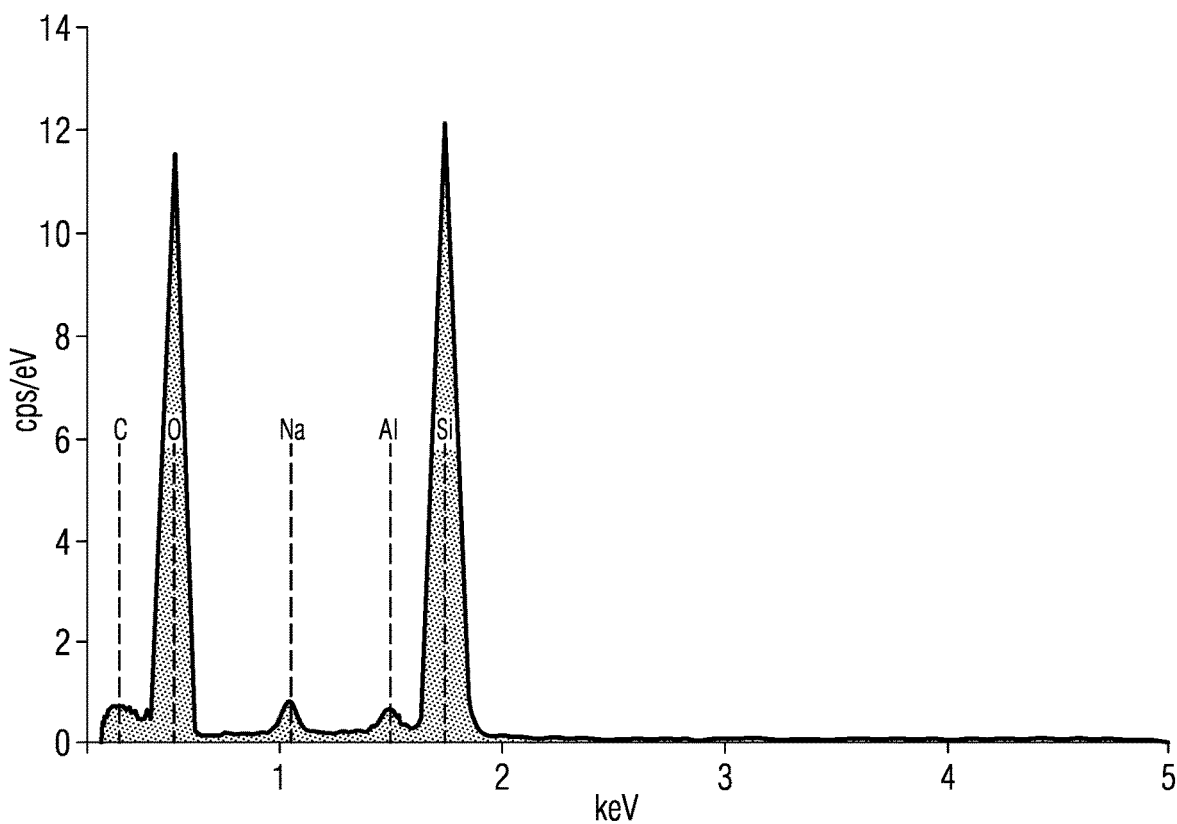
FIG. 6 is an EDS spectrum of the area of glass irradiated by a laser in the presence of $CO_2$.

FIG. 4 shows the emission spectra of the "flash light" during laser irradiation. The peak at 630 nm is the guide laser. The spectra get a little noisy at high wavelengths, but that is to be expected since the spectrometer is not as sensitive in that range and in the emission spectrum of black-body light at 3300 K. Overall, the spectra of "flash light" roughly like blackbody spectra, but don't fit perfectly. The best fit temperature is about 3300 K. The spectra (from 320 to 800 nm) were taken with a USB2000 spectroradiometer (Ocean Optics Inc. Dundein, Fla.) coupled with a 1000 um diameter fiber optic cable. The integration time was 300 msec. The spectra had the baseline stripped and were then were corrected for the spectral sensitivity of the detector, but not calibrated in absolute units. So the values are given in relative watts.

During testing SEM images of the Pyrex reactor wall after laser irradiation showed evidence of the transformation of the glass silica due to the temperature rise and an EDS spectrum of the area of glass irradiated by laser in the presence of $CO_2$ and vapor. A micro-photo detail showed the material formed inside the glass vessel during the laser irradiation of $CO_2$ at a pressure of 100 psi. Another micro-photo detail showed the carbon particles formed inside the glass vessel during the laser irradiation of $CO_2$. Melted silica was also visible (white brilliant points) in the micro-photos. An SEM image showed the carbon-oxygen structures on the vertical surface of the glass vessel during the Er:YAG laser irradiation of CO2.

It should be clear at this time that a method and apparatus for producing carbon-oxygen structures by the Decomposition of Carbon Dioxide Gas has been provided. However the present invention is not to be considered limited to the forms shown which are to be considered illustrative rather than restrictive.

We claim:

1. A method of decomposing carbon dioxide gas comprising:
    evacuating air from a reaction container;
    combining carbon dioxide gas and water vapor gas molecules in said reaction container;
    pressuring said reaction container holding said carbon dioxide with a pressure of from 14.7 to 100 psi;
    directing a mid-infrared laser beam having a wavelength of 2.3 to 3.3 microns into said reaction container to photo-dissociate the carbon dioxide gas into carbon, oxygen and carbon-oxygen activated species; and
    recombining the activated species to form solid carbon-oxygen structures, said solid carbon-oxygen structures having the composition $C_mO_n$ where m n; whereby carbon dioxide gas is decomposed.

2. The method of decomposing carbon dioxide gas in accordance with claim 1 including the step of directing an Er: YAG laser beam with a wavelength of about 2.94 um into said reaction container.

3. The method of decomposing carbon dioxide gas in accordance with claim 1 including the step of directing an HF laser beam with a wavelength of about 2.7 microns into said reaction container.

4. The method of decomposing carbon dioxide gas in accordance with claim 1 including the step of combining said carbon dioxide gas with said water vapor gas molecules to form a weakly bonded carbon dioxide-water which is assisted by the surface of the reaction container.

5. The method of decomposing carbon dioxide gas in accordance with claim 1 including the step of combining said carbon dioxide gas with said water vapor gas molecules to form a weakly bonded carbonic acid which is assisted by the surface of the reaction container.

6. The method of decomposing carbon dioxide gas in accordance with claim 1 in which said reaction container is a glass container.

7. The method of decomposing carbon dioxide gas in accordance with claim 1 in which the carbon dioxide gas is dissociated into carbon, oxygen and carbon-oxygen activated species is by reaction of said mid-infrared light and said water vapor gas mediating molecules.

8. The method of decomposing carbon dioxide gas in accordance with claim 1 including the step of pressuring said reaction container holding said carbon dioxide with a pressure of about 15 psi.

9. A method of decomposing carbon dioxide gas comprising:
  combining carbon dioxide gas and water vapor gas molecules under pressure of between 14.7 to 100 psi in a reaction container having the air evacuated therefrom;
  directing a laser beam having a wavelength of 2.3 to 3.3 microns into said reaction container to photo-dissociate the carbon dioxide gas into carbon, and oxygen;
  and capturing heat released by said reaction; whereby carbon dioxide gas is decomposed to form solid carbon-oxygen structures, said solid carbon-oxygen structures having the composition $C_m O_n$ where $m \geq n$.

10. The method of decomposing carbon dioxide gas in accordance with claim 9 including the step of directing an Er: YAG laser beam with a wavelength of 2.94 μm into said reaction container.

11. The method of decomposing carbon dioxide gas in accordance with claim 9 including the step of directing an HF laser beam with a wavelength of 2.7 microns into said reaction container.

* * * * *